United States Patent
Rhodes

(10) Patent No.: US 11,680,144 B2
(45) Date of Patent: Jun. 20, 2023

(54) SELF-ADHESIVE PREPREG

(71) Applicant: HEXCEL COMPOSITES LIMITED, Duxford (GB)

(72) Inventor: Michael Rhodes, Haverhill (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 7 days.

(21) Appl. No.: 17/604,326

(22) PCT Filed: Apr. 17, 2020

(86) PCT No.: PCT/EP2020/060918
§ 371 (c)(1),
(2) Date: Oct. 15, 2021

(87) PCT Pub. No.: WO2020/216691
PCT Pub. Date: Oct. 29, 2020

(65) Prior Publication Data
US 2022/0213285 A1 Jul. 7, 2022

(30) Foreign Application Priority Data
Apr. 24, 2019 (GB) ..................... 1905718

(51) Int. Cl.
| | | |
|---|---|---|
| C08J 5/24 | (2006.01) | |
| B32B 27/38 | (2006.01) | |
| C08G 59/30 | (2006.01) | |
| C08G 59/32 | (2006.01) | |
| C08G 59/38 | (2006.01) | |
| C08G 59/40 | (2006.01) | |
| C08G 59/68 | (2006.01) | |
| C08L 63/00 | (2006.01) | |
| C08L 63/04 | (2006.01) | |

(52) U.S. Cl.
CPC ............... *C08J 5/245* (2021.05); *C08J 5/243* (2021.05); *C08J 5/244* (2021.05); *C08J 5/249* (2021.05); *C08J 2363/02* (2013.01); *C08J 2363/04* (2013.01); *C08J 2463/02* (2013.01); *C08J 2463/04* (2013.01)

(58) Field of Classification Search
None
See application file for complete search history.

(56) References Cited

U.S. PATENT DOCUMENTS

| | | | |
|---|---|---|---|
| 5,151,318 A | 9/1992 | Dieter et al. | |
| 5,284,702 A | 2/1994 | Yoshitaka et al. | |
| 5,972,810 A | 10/1999 | Gabrisch et al. | |
| 2001/0042593 A1 | 11/2001 | Zhou et al. | |
| 2008/0160860 A1* | 7/2008 | Kuroki | C08G 59/3236 525/410 |
| 2015/0344649 A1* | 12/2015 | Sequeira | C08L 63/00 523/400 |
| 2018/0171087 A1 | 6/2018 | Hanley et al. | |
| 2021/0107250 A1 | 4/2021 | Kawakami et al. | |

FOREIGN PATENT DOCUMENTS

| | | | | | |
|---|---|---|---|---|---|
| CN | 202688253 U | * | 1/2013 | ............... | C09J 7/02 |
| CN | 106046680 A | * | 10/2016 | ............... | C08L 63/00 |
| CN | 106751527 A | * | 5/2017 | ............... | C08L 63/00 |
| CN | 108929520 A | * | 12/2018 | ............... | C08J 5/042 |
| EP | 1303570 B1 | | 3/2007 | | |
| GB | 2510835 A | | 8/2014 | | |
| JP | 09194612 A | * | 7/1997 | ............... | C08J 5/24 |
| JP | 2006272829 A | * | 10/2006 | ............... | B32B 3/12 |
| JP | 2010155877 A | * | 7/2010 | ............... | C08J 5/24 |
| JP | 2016169381 A | * | 9/2016 | ............... | C08G 59/20 |
| WO | 2005/113652 A2 | | 12/2005 | | |

OTHER PUBLICATIONS

Search Report under Section 17(5), issued in a related Great Britain Application, Application No. GB1905718.1, dated Nov. 22, 2019.
International Search Report (ISR) and Written Opinion (WO), issued in the parent Patent Cooperation Treaty (PCT), Application No. PCT/EP2020/060918, dated Jun. 9, 2020.

* cited by examiner

*Primary Examiner* — Michael J Feely
(74) *Attorney, Agent, or Firm* — W. Mark Bielawski

(57) ABSTRACT

A self-adhesive prepreg comprising a fibre reinforcement layer having a first side and a second side, wherein the first side of the fibre reinforcement layer has been pre-impregnated with a self-adhesive resin composition. The self-adhesive may be used as a structural reinforcement and is especially adapted for direct bonding to oily steel or galvanized steel in the automotive, aerospace and other sheet metal fabrication industries.

5 Claims, No Drawings

SELF-ADHESIVE PREPREG

The present invention relates to a self-adhesive prepreg, a process of preparing a self-adhesive prepreg, the use of a self-adhesive prepreg as a structural reinforcement, a method of structurally reinforcing an article using a self-adhesive prepreg and a structurally reinforced article obtainable by such a method. The invention is particularly concerned with the use of self-adhesive prepregs that show good bonding to oily steel or oily galvanized steel as structural reinforcements in the automotive, aerospace, wind turbine and other sheet steel fabrication industries.

Prepreg is the term used to describe fibres and/or fabric pre-impregnated with a resin in the uncured state and ready for curing. The fibres may be in the form of tows or fabrics. The tows or fabrics generally comprise a plurality of thin fibres called filaments. The fibrous material may be in the form of multiple fibre tows each containing multiple fibre filaments to form each tow. The tows may be stitched or woven to form a fabric. The selection of fibre reinforcement materials and resins in a prepreg depends upon the application to which the composite material formed of the cured prepreg is to be used and the properties required of it.

Composite materials are widely used in the automotive, aerospace, construction and other steel sheet fabrication industries, including the wind turbine industry. The manner in which such composite materials are used will depend upon the particular application concerned but may include use as lightweight, rigid body panels, engine bay, exhaust run and fuel system components in the automotive industry, as engine blades, brackets, interiors, nacelles, propellers or rotors, single aisle wings and wide body wings in the aerospace industry, as load bearing and infill panels, pressure pipes, tank liners and roofs in the construction industry, or as rotor blades and nacelles in the wind turbine industry. Some early applications have been well-documented, such as, for example, the use of soybean fibres in the manufacture of phenolic resin composites for a prototype plastic automobile by the Ford Motor Company, Detroit, Mich., United States of America, in the early 1940s, or the use of flax to produce a flax-reinforced composite fuselage for a Supermarine Spitfire single-seater fighter aircraft by Aero Research Limited, Duxford, Cambridgeshire, United Kingdom, in the mid 1940s.

Composite materials for some applications may be manufactured in-situ at their intended place of use from the relevant fibre reinforcement material and resin matrix, but there are a number of problems with this approach, such as reproducibility of the manufacturing process and uniformity of the resultant composite. In particular, insufficient removal of air bubbles from the mixture of the fibre reinforcement material and the resin matrix can result in variations in the desired physical properties of the final composite. Such problems have been largely overcome by the use of prepregs, which can be produced off-site in a highly uniform and consistent manner by specialist manufacturers. Such prepregs are generally supplied sandwiched between two layers of backing cloth to prevent the prepregs from sticking together. The layers of backing cloth can be easily removed at the intended site of use and the prepregs can be laid up manually, or using an automated lay-up process, in a mould or in a tool or in a vacuum bag before being subjected to a final curing step that generally involves the application of heat and pressure.

Some degree of residual tackiness of a prepreg is usually desirable in order to ensure that the prepreg remains sufficiently workable, for example, to take up the shape of a complex mould when laid up by hand or to remain adhered to adjacent prepregs where laid up sequentially in multiple layers or stacks in order to provide greater structural rigidity of the cured composite material. The residual tackiness of a prepreg depends upon the composition of the resin matrix and there is frequently a trade-off between tackiness and flexibility or "drape" of the prepreg which enables it to be shaped within a mould. JPH 09194612 A, for example, discloses a prepreg comprising a reinforcing fibre and a matrix resin, the tackiness T being 0.025 MPa or more and the drapability D being 150 GPa or less. In this document, the tackiness T is defined as the peeling strength after crimping prepreg samples of 50×50 mm under a load of 0.11 MPa, and the drapability D is defined as the bending elastic modulus of the prepreg as measured by a three-point bending test.

Certain applications require a prepreg that can be adhered directly to a substrate prior to curing, thereby obviating the need for a separate film of adhesive to be applied. The use of self-adhesive prepregs as skin layers or face sheets for bonding to a honeycomb core to form sandwich panels, which can be used in various applications that require a combination of high structural rigidity and low weight, such as aircraft floor panels, is well-known. EP 0798102, for example, discloses a sandwich structure with honeycomb and/or foamed core material and outer layers, wherein the core material is connected to the outer layers by means of a cured self-adhesive prepreg based on a resin-impregnated fibre carrier material, characterised in that the prepreg comprises a core layer of fibre carrier material and auxiliary fibre material that forms surface layers, wherein the fibre carrier material of the core layer has a higher weight per unit area than the auxiliary fibre material, and that the weight ratio of resin to fibre material in the surface layers is higher than in the core layer, and that the fibre material structure of fibre carrier material and auxiliary fibre material has been impregnated with a heat-curable resin and the resin has been converted to the B-stage.

Several approaches to increasing the strength of bonding of self-adhesive prepreg face sheets to a honeycomb core for sandwich panels has focused on the formation of thermosetting or thermoplastic fillets extending from the self-adhesive surface of the face sheets into the tube-like structures of the honeycomb core on curing. WO 2005/113652, for example, discloses prepreg compositions comprised of fibres and a prepreg resin, comprising a thermosetting resin, a curing agent, and a plurality of thermoplastic polymers, in which greater than 10% of each of the thermoplastic polymers are soluble in the prepreg resin. The resultant prepreg compositions are used as self-adhesive prepregs for making honeycomb structures useful for various applications. This document teaches that, contrary to expectation, the inclusion of thermoplastic polymers as toughening agents that are partially or completely soluble in the prepreg resin still results in formation of plastic fillets that help bond the prepreg to the honeycomb structure on curing. EP1303570 discloses resin compositions that are used in combination with fibres to form self-adhesive prepreg sheets that are applied to core materials to form sandwich panels. The prepreg resin includes a thermoset resin, a curing agent and a viscosity control agent. The prepreg resin further includes certain thermoplastic particles, such as densified particles of polyethersulfone or polyetherimide, which are used to control the flow characteristics of the prepreg resin and the formation of fillets during bonding of the prepreg to the core material.

WO 2018/174217 teaches that bonding of self-adhesive prepreg face sheets to a honeycomb core in sandwich panels based on fillet formation provides insufficient peel strength of the face sheets bonded to the core. This document discloses a method of improving bonding of self-adhesive prepreg face sheets to a honeycomb core that involves increasing drapability of the face sheet over the core by laminating a self-adhesive prepreg containing a non-woven fabric impregnated with a second thermosetting resin onto a base prepreg comprising a fibre reinforcement material impregnated with a first thermosetting resin.

The various approaches to making sandwich panels using self-adhesive prepregs as face sheets described above suffer from certain disadvantages, such as the need to include thermoplastic polymers in addition to thermosetting polymers as resin components, or the need to use additional non-woven fibre or fabric layers in the prepreg, which may necessitate additional industrial process steps. Moreover, the foregoing approaches and many others in this field are concerned with the specific problem of bonding prepregs to honeycomb cores to form sandwich panels, which are widely used as aircraft floor panels. Other applications in which self-adhesive prepregs have found utility include adhesive prepreg strips for producing copper clad laminates for printed circuit board manufacture, as disclosed, for example, in CN202688253(U), or as insulating structural components in the manufacture of electric motors for use in automobiles, as disclosed, for example, in JP2010155877A. However, prepregs are widely used in many different applications in the automotive, wind turbine, construction and other sheet steel fabrication industries. Such applications frequently require prepregs to be bonded to oily steel or oily galvanized steel, as structural components or as reinforcement layers, which may be exposed to adverse or extreme weather conditions over lengthy periods of time, and traditional methodology generally necessitates the use of structural adhesives to bond such parts or layers to their target substrate.

The invention aims to overcome some of the aforesaid problems and/or to provide improvements generally.

According to the present invention, there is provided a prepreg, a use, a process, a stack, a method and an article as described hereinafter or as defined in any one of the accompanying claims.

Accordingly, in a first aspect of the invention, there is provided a prepreg comprising a fibre reinforcement layer having a first side and a second side, wherein the first side of the fibre reinforcement layer has been pre-impregnated with a self-adhesive resin composition. Self-adhesive in this context refers to a resin composition which is adapted to adhere to metal substrates providing desired adhesive properties at ambient temperature.

The fibre reinforcement layer comprises a fibrous material which may in the form of a sheet or continuous mat or continuous filaments. In other embodiments, the fibre reinforcement layer may comprise a natural fibre or staple fibre of short length. The fibrous material may be in the form of multiple fibre tows each containing multiple fibre filaments to form each tow. The tows may be stitched or woven to form a fabric. The fibre reinforcement layer has a first side and a second side. In an embodiment, the layer of fibre reinforcement is substantially flat and the first side and the second side of the layer are defined by upper and lower surfaces of the plane containing the fibre reinforcement. In other embodiments, the fibre reinforcement layer is curved and the first and second sides of the layer are defined by its upper and lower curved surfaces. In further embodiments, the fibre reinforcement layer has an irregular surface with flat and curved regions. The layer may be relatively thin and have relatively narrow edges. In embodiments, the layer of fibre reinforcement material has a thickness of 100, 200, 300, 400 or 500 µm. In other cases, the layer of fibre reinforcement may be relatively thick and may have relatively wide edges. In embodiments, the layer of fibre reinforcement material has a thickness of 500, 600, 700, 800, 900 or 1000 µm or more. In certain embodiments, at least one of the first or second sides of the fibre reinforcement layer is defined by an edge of the layer. In one embodiment, the fibre reinforcement layer is flat and relatively thick, and the first side is defined by a surface of the plane containing the fibre reinforcement layer and the second side is defined by a plane containing an edge of the fibre reinforcement layer, where the two planes are mutually orthogonal to one another. In other embodiments, neither the fibre reinforcement layer not the first and second sides are defined by geometrically regular surfaces.

The fibres may consist of natural materials, such as cotton, flax, hemp, wool, silk, glass fibres, carbon fibres, mineral fibres, etc., semi-synthetic materials, such as rayon, viscose, modal, etc., or synthetic materials, such as carbon, polyester, nylon, acrylic, synthetic glass, etc. In embodiments, the fibre reinforcement comprises carbon fibres or glass fibres.

In an embodiment, the fibre reinforcement is in the form of non-woven fibrous material such as a veil or a discontinuous fibre fleece. Suitable glass and carbon or metal-coated carbon veils are commercially available under the trade name Optiveil® from Technical Fibre Products Limited, Burnside Mills, Kendal, Cumbria, United Kingdom.

In another embodiment, the fibre reinforcement is in the form of a woven fabric. In this embodiment, the warp and weft of the fabric may be formed from fibre tows or fibre filaments. In other embodiments, the fibre reinforcement is in the form of a non-woven fabric or mat in which a non-structural stitching thread, such as a polyester yarn, is used to bind together two or more layers of fibre tows to avoid misalignment, instead of using a conventional weaving process. The fibre tows or filaments in adjacent layers may be in a different spatial orientation relative to one another, such as, for example, a fabric consisting of two layers of unidirectional fibre tows in which the fibre tows in the first layer are at an angle of −45° and the fibre tows in the second layer are at an angle of +45°, relative to a forward axis in the two dimensional plane containing both layers. Such non-woven fabrics may be biaxial or multiaxial depending upon the number of layers of fibre tows at different angles to one another. The use of stitching instead of weaving to hold the layers of fibre tows together is known to improve drapability of the resultant non-woven fabric, thereby reducing the tendency of the fabric and prepreg formed therefrom to crimp, i.e., to form furrows or ridges, when laid up in a mould. Consequently, engineered fabrics of this type are often referred to as non-crimp fabrics (NCF).

Suitable woven and non-woven fabrics for use in composites are commercially available from a number of specialist manufacturers including Chomarat Textiles Industries, Esher, Surrey, United Kingdom, Hexcel Reinforcements UK Limited, Narborough, Leicestershire, United Kingdom, and Zhenshi Group Hengshi Fibreglass Fabrics Co., Ltd., Tongxiang Economic Development Zone, Jiaxing Zhejiang, 314500 China. In an embodiment, the woven fabric is a carbon fibre or glass fibre biaxial non-woven fabric, such as BB200, BB600 or BB1200.

Hybrid or mixed fibre systems may also be envisaged. The use of cracked (i.e. stretch-broken) or selectively discontinuous fibres may be advantageous to facilitate lay-up of the product according to the invention and improve its capability of being shaped.

The surface mass of fibres within the fibre reinforcement is generally in the range of 80-4000 g/m$^2$. In embodiments, the surface mass of fibres is in the range of 100 to 2500 g/m$^2$, 150 to 2000 g/m$^2$, 150 to 1200 g/m$^2$, 200 to 1200 g/m$^2$, 200 to 600 g/m2 or 200 to 400 g/m2, or any combination thereof. The number of carbon filaments can vary from 3000 to 320,000, again preferably from 6,000 to 24,000. For fibreglass reinforcements, fibres of 600-2400 tex are particularly adapted.

The fibres may be utilised in unidirectional form, or as non-woven mats, woven fabrics, multi-axial fabrics or non-crimped fabrics. Combinations of those reinforcement forms may also be utilized.

The self-adhesive resin composition and, if present, second resin composition may be loaded onto the fibre reinforcement in quantities such that the loading of resin is in the range of 20-90% by weight based on the total weight of the resin and fibre reinforcement present in the prepreg. In embodiments, the fibre reinforcement is in the form of a veil or discontinuous fibre fleece and the loading of resin is in the range of 20 to 90%, 30 to 90%, 40 to 90%, or 50 to 90% by weight based on the total weight of resin and fibre reinforcement present in the prepreg, or any combination thereof. In other embodiments, the fibre reinforcement is in the form of a woven, non-woven or non-crimp fabric or mat and the loading of resin is in the range of 20 to 90%, 20 to 80%, 20 to 70%, 20 to 60%, to 50%, or 30 to 50% by weight based on the total weight of resin and fibre reinforcement, or any combination thereof.

In certain applications, the reinforcing material may act as a support for the self-adhesive resin composition, as well as providing other functional or structural benefits, The reinforcing material may act not only as a support for the self-adhesive resin composition but also to control the thickness of the adhesive layer so as to ensure that an optimum minimum bondline thickness of the self-adhesive resin composition is present between the two surfaces to be bonded.

The fibre reinforcement layer may also improve the flow of the adhesive composition during curing of the self-adhesive resin composition and/or it may improve handling.

In the foregoing embodiments, it is important that the reinforcing material, whether in the form of a veil, fleece, fabric or otherwise, should not interfere to any significant extent with the adhesive properties of the self-adhesive resin composition.

In the first aspect of the invention, the first side of the fibre reinforcement layer has been pre-impregnated with a self-adhesive resin composition. In an embodiment, only the first side of the fibre reinforcement layer has been pre-impregnated with a resin composition, such that the second side of the fibre reinforcement layer is not impregnated and the prepreg is a semipreg. In a further embodiment, the second side of the fibre reinforcement layer has been pre-impregnated with the same self-adhesive resin composition as the first side such that the prepreg is symmetrical. In another embodiment, the second side of the fibre reinforcement layer has been pre-impregnated with a second resin composition that has different properties to the self-adhesive resin composition such that the prepreg is asymmetrical. Depending upon the particular application in which the prepreg is to be used, the second resin composition may be an adhesive composition having different characteristics to the self-adhesive resin composition, such as a low tack adhesive composition. In other cases, the second resin composition may be a conventional prepreg resin matrix and/or may be substantially or completely non-adhesive. In an embodiment, the second resin composition is substantially non-adhesive and the self-adhesive resin composition can be bonded to the second resin composition when multiple prepregs are laid up sequentially to form stacks of prepregs. In this last embodiment, the use of a second resin composition having a simpler formulation to impregnate the second side of the fibre reinforcement layer can reduce the amount of self-adhesive resin composition required to form prepregs or stacks of prepregs, which may serve to reduce overall industrial process costs. The second resin composition may include an internal release agent, for example, to facilitate removal of an article from a mould after curing.

The self-adhesive resin composition used in the present invention shows good bonding to oily steel or oily galvanized steel with good lap shear strengths at ambient and elevated temperatures, even in the absence of nitrile rubbers as toughening agents. However, the inclusion of such nitrile rubbers and/or core shell rubbers as toughening agents in the compositions may provide other benefits, such as increased resistance to crack formation. In an embodiment, the self-adhesive resin composition has a steel to steel or zinc galvanized steel to zinc galvanized steel lap shear strength of at least 20 MPa at ambient temperature. Steel to steel lap shear strength may be measured in accordance with BS EN2243-1: 2005, which is available from the British Standards Institution, 389 Chiswick High Road, London, W4 4AL, United Kingdom, or ISO 204: 2009 and/or ISO 527-2:2012, which are available from the International Organization for Standardization, ISO Central Secretariat, Chemin de Blandonnet 8, CP 401-1214, Vernier, Geneva, Switzerland. In further embodiments, the self-adhesive resin composition has a steel to steel or galvanized steel to galvanized steep lap shear strength in a range of 20 to 40 MPa, 22 to 35 MPa, 25 to 35 MPa, or 25 to 30 MPa, or any combination thereof.

The self-adhesive resin composition shows good peel strength when tested on aluminium-aluminium joints at ambient temperature when cured. Aluminium to aluminium peel strength values may be measured in accordance with BS EN2243-2:2005, which is available from the British Standards Institution, 389 Chiswick High Road, London W4 4AL, United Kingdom. In an embodiment, the self-adhesive resin composition has a peel strength of at least 80N/25 mm at ambient temperature, In other embodiments, the self-adhesive resin composition has a peel strength in the range of 80 to 250N/25 mm, 85 to 230N/25 mm, 90 to 180N/25 mm, 95 to 150N/25 mm, or 100 to 130N/25 mm, or any combination thereof.

In another embodiment, the cured self-adhesive resin composition has an initial cured Tg (peak loss modulus, E" Tg) of 70 to 160° C. The cured Tg is measured in accordance with ASTM D7028-7(2015) (Standard Test Method for Glass Transition Temperature (DMA Tg) of Polymer Matrix Composites by Dynamic Mechanical Analysis (DMA)), which can be obtained from ASTM International, 100 Barr Harbor Drive, P.O. Box C700, West Conshohocken, Pa., 19428-2959, USA. The wet Tg or retained Tg following hot wet aging is measured following isothermal curing at 150° C. for 15 minutes with no post-cure of the neat adhesive composition and exposing the cured composition to water at 70° C. for 14 days, and then measuring the Tg of the sample using the same measurement standard ASTM D7028. The retained Tg is expressed as a percentage of the (wet Tg/initial cured Tg)×100.

In further embodiments, the self-adhesive resin composition has an initial cured Tg in any one of the ranges of 80 to 150° C., 90 to 145° C., or 100 to 140° C., or any combination thereof. In an embodiment, the self-adhesive resin composition has an E" Tg retention of at least 70% after hot wet aging at 70° C. for 14 days, preferably at least 75%, preferably at least 80%.

The self-adhesive resin compositions used in the present invention are curable under conditions that do not require heating at elevated temperatures for lengthy periods of time. In an embodiment, the self-adhesive resin composition is cured by heating at a temperature of 140° C. to 170° C. for no more than 60 minutes.

The constituents of the self-adhesive compositions used in the present invention are described in detail hereinafter, but, for example, such compositions may comprise one part or one component (1 K) epoxy resin systems which already contain a curing agent, such that no additional components are required in order for the composition to be cured. In general terms, 95% cure defines an epoxy resin containing composition in which a sufficient majority of the reactive sites have been consumed so that the mechanical performance and thermal resistance of the cured composition is within the desired characteristic range for that composition to provide the desired mechanical and chemical performance properties. It is possible to expend additional time and energy to obtain the final 5% of cure but this will not result in a significant mechanical or thermal improvement. Differential Scanning Calorimetry (DSC) is utilized to monitor the time to reach 95% cure. To measure the degree of cure using Digital Scanning Calorimetry the heat released during the curing reaction is related to the total heat for fully curing. This can be measured as follows. A reference resin sample is heated from 10° C. to 250° C. at 10° C./minute rate to full cure (100%) and the generated heat $\Delta Hi$ is recorded. The degree of cure of a particular resin sample of the same composition as the reference resin sample can then be measured by curing the sample to the desired temperature and at the desired rate and for the desired time by heating the sample at these conditions and measuring the heat $\Delta He$ generated by this cure reaction. The degree of cure (Cure %) is then defined by:

Cure %=[($\Delta Hi$–$\Delta He$)/$\Delta Hi$]×100[%]

where $\Delta Hi$ is the heat generated by the uncured resin heated from 10° C. up to fully cured at 250° C. and $\Delta He$ the heat generated by the certain degree cured resin heated up to a desired temperature and rate.

In an embodiment, the self-adhesive resin composition is 95% cured at a temperature of 140° C. to 170° C. for up to 60 minutes, preferably no more than 45 minutes. In further embodiments, the adhesive composition is 95% cured at a temperature of 150° C. to 160° C. for up to 20 minutes, or 160° C. to 170° C. for up to 10 minutes, or any combination thereof. The adhesive composition may be cured at a temperature of approximately 170° C. for up to 5 minutes, preferably no more than 2.5 minutes. In other embodiments, the adhesive resin composition can be cured by heating the composition up to 150° C. for no more than 150 seconds, preferably no more than 120 seconds. This may be desirable in applications where a self-adhesive prepreg according to the present invention is intended to be used to provide structural reinforcement and it is important for the prepreg to be adhered to a substrate and cured in situ as rapidly as possible.

The self-adhesive resin composition may include a corrosion inhibitor. This is particularly desirable where the fibre reinforcement layer comprises carbon fibre or other conductive fibres that may facilitate corrosive processes, especially in applications where prepregs or structures reinforced with prepregs according to the invention may be exposed to the elements. The corrosion inhibitor may comprise an inorganic corrosion inhibitor, such as, for example, a molybdenum salt especially a salt including a molybdate oxoanion, calcium nitrite, a rare earth metal salt, zinc phosphate or other metal phosphate salts, a chromium salt especially a chromate, or a lanthanide compound. In some applications, self-adhesive prepregs according to the present invention may be bonded to oily steel or oily galvanized steel structures that may be exposed to adverse or even extreme weather conditions, such as, for example, in wind turbines. In an embodiment, the corrosion inhibitor is an inorganic corrosion inhibitor that does not contain chromates or other chromium salts, due to the risk of such salts leaching out over time and contaminating the environment. In another embodiment, the corrosion inhibitor is an inorganic phosphate or polyphosphate salt. Suitable inorganic phosphate or polyphosphate salts include Heucophos® ZPA (zinc aluminium orthophosphate), Heucophos® ZMP (basic zinc molybdenum orthophosphate hydrate), Heucophos® CMP (calcium phosphate complex modified with an electrochemical active magnesium compound), Heucophos® ZAPP (zinc aluminium polyphosphate hydrate), Heucophos® SAPP (strontium aluminium polyphosphate hydrate), Heucophos® SRPP, Heucophos® CAPP, Heucophos® ZAM Plus and Heucophos® ZCP Plus, which are commercially available from Heubach GmbH, Langelsheim, Germany. In an embodiment, the inorganic corrosion inhibitor is a strontium aluminium polyphosphate hydrate.

The corrosion inhibitor may comprise an organic corrosion inhibitor. Effective organic corrosion inhibitor compounds generally contain heteroatoms with lone pair electrons, such as nitrogen, oxygen, sulphur and phosphorus, as well as structural moieties with π-electrons that interact with metal favouring the absorption process. Compounds containing nitrogen may include amines, pyridine derivatives, quaternary ammonium salts, triazole derivatives, Schiff's bases, amino acids and indazole. Compounds containing nitrogen and sulphur atoms may include imidazole derivatives, thiadiazole derivatives, and thiazole derivatives. Compounds containing sulphur may include thiourea derivatives and sulfonates. Compounds containing nitrogen and oxygen may include oxazole derivatives, phthalimides and plant extracts/natural extracts. Illustrative non-limiting examples of some of the foregoing classes of organic compounds include 2-(4-nitrophenyl)benzimidazole, (6-methyl-3-oxopyridazine-2-yl) acetate, Schiff's bases, L-cysteine, imidazoline isomers, N-decyl-3-amino-1,2,4-triazole and adenosine. The corrosion inhibitor may be a metal salt of an organic compound. One suitable compound is zinc-5-nitroisophthalate, which is commercially available from Heubach GmbH, Langelsheim, Germany under the trade name Heucorin® RZ. In an embodiment, the corrosion inhibitor comprises an inorganic corrosion inhibitor in conjunction with an organic corrosion inhibitor. The inorganic corrosion inhibitor and the organic corrosion inhibitor may provide a synergistic effect in inhibiting or reducing corrosive processes. In an embodiment, the corrosion inhibitor comprises a combination of zinc-5-nitroisophthalate and a strontium aluminium polyphosphate hydrate.

The corrosion inhibitor may be present in the self-adhesive resin composition in an amount of 0.05 to 10% by weight based on the total weight of the composition, preferably 0.5 to 2% by weight based on the total weight of the composition. In cases where an inorganic corrosion inhibitor is used in conjunction with an organic corrosion inhibitor, the inorganic corrosion inhibitor may be present in an amount of 0.5 to 2% by weight and the organic corrosion inhibitor may be present in an amount of 0.01 to 0.5% by weight, based on the total weight of the composition. Efficacy of corrosion inhibition was assessed by salt-spray corrosion testing.

The self-adhesive resin composition in the present invention may comprise any suitable polymerizable components commonly used in one part or one component structural adhesives, including anaerobic adhesives, especially those based on multifunctional methacrylate monomers such as dimethacrylates and trimethacrylates, epoxy adhesives, reactive acrylic adhesives especially those based on monofunctional acrylate or methacrylate monomers, ultraviolet (UV) light cured adhesives especially those based on vinyl ethers, vinyl ether esters, urethane vinyl ethers and cycloaliphatic epoxies, polyurethanes, reactive hot melt polyurethanes (RHMU), cyanoacrylates and polysulfones/polyethersulfones (PES) especially reactive polysulfones including aminophenyl functional reactive polysulfones. self-adhesive resin compositions based on epoxy resin systems are particularly preferred in the present invention on account of the flexible nature of such systems and the wide range of properties achievable, especially when the prepregs are asymmetric and include a second resin composition in addition to the self-adhesive resin composition.

In an embodiment, the self-adhesive resin composition comprises by total weight of the composition:
  (a) 1 to 45% aromatic epoxy resin;
  (b) 5 to 60% novolac epoxy resin;
  (c) 1 to 10% curing agent; and, optionally.
  (d) 0.05 to 10% corrosion inhibitor.

In this last embodiment, the self-adhesive resin composition contains (a) at least one aromatic epoxy resin, in addition to (b) at least one novolac epoxy resin, as described hereinafter. Components (a), (b) and (c) together form a catalysed one-component epoxy resin system. Aromatic epoxy resins as referred to herein are epoxy resins containing at least one aromatic unit in the backbone or in a side chain, if present. Typically, the aromatic epoxy resins include at least one aromatic epoxide moiety, such as, for example, a glycidyl ether, preferably at a terminal position of the resin backbone or side chain, if present. Aromatic epoxy resins that can be used include, for example, the reaction product of phenols (phenols and formaldehyde) and epichlorohydrin, peracid epoxies, glycidyl esters, glycidyl ethers, the reaction product of epichlorohydrin and amino phenols, the reaction product of epichlorohydrin and glyoxal tetraphenol, and the like. Phenols as referred to above include polynuclear phenols (i.e. compounds having at least two phenol functional groups). Typical examples of polynuclear phenols are bisphenols.

The aromatic epoxy resin can be in solid or semi-solid form or a blend thereof. Suitable epoxy resins may comprise blends of two or more epoxy resins selected from monofunctional, difunctional, trifunctional, and/or tetrafunctional epoxy resins. Suitable difunctional epoxy resins, for example, include those based on: bisphenol F, bisphenol A (optionally brominated), phenol, aromatic glycidyl amines, naphthalene, or any combination thereof.

Suitable solid or semi-solid aromatic epoxy resins are commercially available from Huntsman Advanced Materials (Switzerland) S. A., Monthey, Switzerland, under the tradename Araldite®. Suitable high molecular weight basic solid epoxy resins include Araldite® GT 6097, Araldite® GT 6099, Araldite® GT 6609, Araldite® GT 6610, Araldite® GT 6810-1, Araldite® GT 7077 and Araldite® GT 16099. Suitable medium to low weight basic solid epoxy resins include Araldite® GT 6063, Araldite® GT 6063, Araldite® GT 6064, Araldite® GT 6071, Araldite® GT 6084-2, Araldite® GT 6703, Araldite® GT 7004, Araldite® GT 7071 and Araldite® GT 7072. Suitable semi-solid basic epoxy resins include Araldite® GY 280 and Araldite® LY1589, which are both available from Huntsman Advanced Materials, and Epokukdo YD-134 and Epokukdo YD-136, which are commercially available from Kukdo Chemical Company Limited, Seoul, South Korea. However, the aromatic epoxy resin is not limited to the foregoing and includes other solid and semi-solid basic epoxy resins commonly used in epoxy adhesives and commercially available from a number of manufacturers and suppliers.

The aromatic epoxy resin may be a silane modified epoxy resin prepared by reacting a silane compound represented by the following Chemical Formula 1 and an epoxy resin:

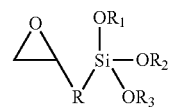

[Chemical Formula 1]

In Chemical Formula 1, R is an aliphatic or aromatic alkylene group; and $R_1$, $R_2$ and $R_3$ are independently an aliphatic or aromatic alkyl group. The use of silane-modified epoxy resins prepared from compounds of Chemical Formula 1 is described in EP2799509, whose disclosure in relation to the same is hereby incorporated by reference. Silane-modified epoxy resins suitable for use in the present invention may include KSR-176, KSR-177, KSR-276, KSR-900, etc., which are commercially available from Kukdo Chemical Company Limited, Seoul, South Korea.

In an embodiment, the silane-modified epoxy resin is a difunctional epoxy resin. For example, the epoxy resin may be a silane-modified epoxy resin based on a diglycidyl ether of bisphenol A or bisphenol F. In a further embodiment, the silane-modified epoxy resin is a multifunctional epoxy resin. Higher functionality provided by difunctional or multifunctional silane-modified epoxy resins may be useful in improving performance for specific applications of the adhesive composition.

In a further embodiment, the silane-modified epoxy resin is an alkoxy- or arylalkoxysilane-modified epoxy resin. For example, in Chemical Formula 1, R may be selected from the group consisting of $C_1$ to $C_{20}$ alkylene group, arylene group, arylalkylene group, and alkylarylene group; and $R_1$, $R_2$ and $R_3$ may each independently be selected from the group consisting of $C_1$ to $C_{20}$ alkyl group, aryl group, arylalkyl group, and alkylaryl group.

The silane-modified epoxy resin may have an epoxy equivalent weight (EEW) of 170 to 1,000 grams/equivalent (g/eq). Preferably, the silane-modified epoxy resin has an EEW of 170 to 700 g/eq. In embodiments, the silane-modified epoxy resin has an EEW in the range of 190 to 220 g/eq, 240 to 270 g/eq, 450 to 500 g/eq or 600 to 700 g/eq, or any combination thereof.

The silane-modified epoxy resin may be present in an amount of 1 to 15% by weight based on the total weight of the composition. In embodiments, the silane-modified epoxy resin is present in an amount of 3 to 12%, 4 to 10%, 4 to 8%, or 5 to 7.5% by weight based on the total weight of the composition, or any combination thereof.

We have found that self-adhesive resin compositions containing silane-modified epoxy resins provide good bonding to oily steel or oily galvanized steel with good lap shear strengths at room and elevated temperatures, even in the absence of nitrile rubbers as toughening agents. The self-adhesive resin compositions also have desirable glass transition temperatures (peak loss modulus, E" Tg) which show good E" Tg retention after hot wet aging.

The self-adhesive resin compositions used in the present invention include at least one novolac epoxy resin. The novolac epoxy resin may be a phenol novolac epoxy resin, a cresol novolac epoxy resin, a bisphenol A novolac epoxy resin, or a dicyclopentadiene novolac epoxy resin, or any combination thereof. Examples of suitable novolac epoxy resins include, but are not limited to, YDPN-631 (phenol novolac epoxy resin), YDPN-638 (phenol novolac epoxy resin), YDCN-500-1P (cresol novolac epoxy resin), YDCN-500-4P (cresol novolac epoxy resin), YDCN-500-5P (cresol novolac epoxy resin), YDCN-500-8P (cresol novolac epoxy resin), YDCN-500-10P (cresol novolac epoxy resin), YDCN-500-80P (cresol novolac epoxy resin), YDCN-500-90P (cresol novolac epoxy resin), KBPN-110 (bisphenol A (BPA) novolac epoxy resin), KBPN-115 (BPA novolac epoxy resin), KBPN-120 (BPA novolac epoxy resin), KDMN-1065, KDCP-130 (dicyclopentadiene (DCPD) epoxy resin), KDCP-150 (dicyclopentadiene (DCPD) novolac epoxy resin), and KDCP-130EK80, which are manufactured by Kukdo Chemical Company Limited, Seoul, South Korea, and XD1000 (DCPD novolac epoxy resin), which is available from Nippon Kayaku, KK, Tokyo, Japan, SCT-150 (phenol novolac epoxy resin, which is manufactured by Shin-A T&C, Seoul, South Korea. In an embodiment, the novolac epoxy resin is a phenol novolac epoxy resin or a dicyclopentadiene epoxy resin.

The novolac epoxy resin may generally be present in an amount of 5 to 60% by weight based on the total weight of the composition. In embodiments, the novolac epoxy resin may be present in an amount in any one of the ranges of 5 to 55% by weight, 6 to 50% by weight, 7 to 45% by weight, or 8 to 45% by weight based on the total weight of the composition, or any combination thereof. In compositions comprising a phenol or cresol novolac epoxy resin, the phenol or cresol novolac epoxy resin may be present in an amount of 5 to 20% by weight based on the total weight of the composition. In embodiments, the phenol or cresol novolac epoxy resin may be present in an amount in any one of the ranges of 5 to 18% by weight, 6 to 16% by weight, 8 to 14% by weight, or 10 to 12% by weight based on the total weight of the composition, or any combination thereof. In compositions comprising a dicyclopentadiene novolac epoxy resin, the dicyclopentadiene novolac epoxy resin may be present in an amount of 5 to 60% by weight based on the total weight of the composition. In embodiments, the dicyclopentadiene novolac epoxy resin may be present in an amount in any one of the ranges of 5 to 55% by weight, 10 to 50% by weight, 15 to 45% by weight, or 20 to 45% by weight based on the total weight of the composition, or any combination thereof.

The reactivity of an epoxy resin is indicated by its epoxy equivalent weight (EEW); the lower the EEW the higher the reactivity. The epoxy equivalent weight can be calculated as follows: (Molecular weight epoxy resin)/(Number of epoxy groups per molecule). Another way is to calculate with epoxy number that can be defined as follows: Epoxy number=100/epoxy equivalent weight. To calculate epoxy groups per molecule: (Epoxy number×molecular weight)/100. To calculate molecular weight: (100×epoxy groups per molecule)/epoxy number. To calculate molecular weight: epoxy equivalent weight×epoxy groups per molecule.

In an embodiment, the phenol novolac epoxy resin has an EEW of 150 to 250 g/eq. In further embodiments, the phenol novolac epoxy resin has an EEW in any one of the ranges of 150 to 240 g/eq, 155 to 235 g/eq, 160 to 230 g/eq or 165 to 200 g/eq, or any combination thereof.

In an embodiment, the cresol novolac epoxy resin has an EEW of 150 to 250 g/eq. In further embodiments, the cresol novolac epoxy resin has an EEW in any one of the ranges of 160 to 240 g/eq, 170 to 230 g/eq, 180 to 220 g/eq or 190 to 215 g/eq, or any combination thereof.

The cresol novolac epoxy resins are generally solid at room temperature. In further embodiments, the cresol novolac epoxy resin has a softening point in any one of the ranges of 45 to 100° C., 50 to 95° C., 60 to 85° C., or 65 to 80° C., or any combination thereof.

In an embodiment, the dicyclopentadiene novolac epoxy resin has an EEW of 200 to 300 g/eq. In further embodiments, the dicyclopentadiene novolac epoxy resin has an EEW in any one of the ranges of 230 to 290 g/eq, 240 to 270 g/eq, 240 to 260 g/eq or 245 to 255 g/eq, or any combination thereof. In one embodiment. the dicyclopentadiene novolac epoxy resin has an epoxy equivalent weight of approximately 245 to 260 g/eq The dicyclopentadiene novolac epoxy resins are generally solid at room temperature. In further embodiments, the dicyclopentadiene novolac epoxy resin has a softening point in any one of the ranges of 60 to 90° C., 65 to 75° C., 68 to 78° C., 75 to 85° C. or 79 to 81° C., or any combination thereof.

The curing agent used in the present invention may be any single curing agent commonly used in connection with epoxy adhesives or any combination of curing agents. In an embodiment, the curing agent is an amine or a latent amine curing agent. The amines may be aliphatic, cycloaliphatic, aromatic, or aromatic structures having one or more amino moieties. Exemplary amine curing agents include ethylenediamine, diethylenediamine, diethylenetriamine, triethylenetetramine, propylenediamine, tetraethylenepentamine, hexaethyleneheptamine, hexamethylene diamine, cyanoguanidine, 2-methyl-1,5-pentamethylene diamine, 4,7,10-trioxatridecan-1,13-diamine, aminoethylpiperazine, and the like. Exemplary curing agents include dicyanopolyamides, such as dicyandiamide (DICY). 4,4'-diaminodiphenylsulfone (4,4'-DDS) or 3,3'-diaminodiphenyl (3,3'-DDS) can also be beneficially employed as a latent amine curing agent, as well as mixtures of DICY and DDS. Dihydrazides such as adipic acid dihydrazide (ADH), isophthalic dihydrazide (IDH) and Polyamines such as Ancamine® 2441 (Evonic Resource Efficiency GmbH, Marl, Germany) and boron trifluoride monoethylamine (BF3-MEA) complexes such as Anchor 1040 (Air Products Limited, Walton on Thames, Surrey, United Kingdom) are also suitable as a latent curing agent.

In another embodiment, the curing agent is a mixture of a urea based curing agent component in combination with an imidazole curing agent component. The imidazole curing agent may be an imidazole compound or an imidazole adduct. Suitable imidazole curing agent may be selected from one or more of the following components: 2-methylimidazole, 2-undecylimidazole, 2-heptadecylimidazole, 1,2-dimethylimidazole, 2-ethyl-4-methylimidazole, 2-phenylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium-trimellitate, 1-cyanoethyl-2-phenylimidazolium-trimellitate, 2,4-diamino-6-[2'-methylimidazolyl-(1')]-ethyl-s-triazine, 2,4-diamino-6-[2'-methylimidazolyl-(1')]-ethyl-s-triazine, 2,4-diamino-6-[2'-undecylimidazolyl-(1')]-ethyl-s-triazine powder, 2,4-diamino-6-[2'-ethyl-4'-methylimidazolyl-(1')]-ethyl-s-triazine, 2,4-diamino-6-[2'-methylimidazolyl-(1')]-ethyl-s-triazineisocyanuric acid adduct dehydrate, 2,4-diamino-6-[2'-methylimidazolyl-(1')]-ethyl-s-triazineisocyanuric acid adduct dehydrate, 2-phenylimidazoleisocyanuric acid adduct, 2-phenyl-4,5-dihydroxymethylimidazole, 2-phenyl-4-methyl-5-hydroxymethylimidazole, 2,3-dihydro-1H-pyrrolo[1,2-a], 1-dodecyl-2-methyl-3-benzylimidazolium chloride, 2-phenylimidazoline-2,4-diamino-6-vinyl-1,3,5-triazine, 2,4-diamino-6-vinyl-1,3,5-triazineisocyanuric acid adduct, or 2,4-diamino-6-methacryloyloxyethyl-1,3,5-triazine.

In an embodiment, the curing agent or agents may be isolated from the other components of the adhesive composition, for example, by encapsulating the curing agent to prevent direct contact of the curing components of the curing agents with the remainder of the resin matrix. In an embodiment, the curing agent is present in an amount of 1 to 10% by weight based on the total weight of the composition. In further embodiments, the curing agent is present in an amount of 2 to 9%, 3 to 8%, 4 to 7% or 5 to 6% by weight based on the total weight of the composition, or any combination thereof.

The self-adhesive resin composition may further comprise a toughening agent. In one embodiment, the toughening agent comprises a core-shell rubber, such as the core-shell rubbers produced by Kaneka Corporation, Tokyo, Japan, under the trade name Kane Ace® or Kane Ace MX®. Examples of such core shell rubbers include Kane Ace® MX-150, MX-153, MX-154, MX-257, MX-134, MX-135, MX-136, MX-139, MX-267, MX-215, MX-217, MX-236, MX-550, MX-551 and MX553, which are all epoxy-resin based. The core-shell rubber may be present in an amount of 5 to 30% by weight based on the total weight of the composition. In further embodiments, the core-shell rubber is present in an amount of 10 to 30%, to 30%, or 20 to 30% by weight based on the total weight of the composition, or any combination thereof.

In another embodiment, the toughening agent comprises a nitrile rubber or nitrile rubber adduct. Suitable rubber tougheners include functionalized butadiene acrylonitrile copolymers such as carboxyl-terminated butadiene-acrylonitrile (CTBN) and amine-terminated butadiene-acrylonitrile (ATBN) rubbers or rubber adducts. Exemplary CTBN or ATBN rubbers are available under the trade names Struktol® Polydis® 3604, 3611, 3614 and 3619, from Schill and Seilacher "Struktol" GmbH, Hamburg, Germany. The nitrile rubber may be present in an amount of 1 to 40% by weight based on the total weight of the composition. In further embodiments, the nitrile rubber is present in an amount of 2 to 35%, or 3 to 33% by weight based on the total weight of the composition, or any combination thereof. In an embodiment, the self-adhesive resin composition comprises a dicyclopentadiene novolac epoxy resin and a nitrile rubber or nitrile rubber adduct and the nitrile rubber or nitrile rubber adduct is present in an amount of 1 to 15% by weight, preferably 1 to 10% by weight, based on the total weight of the composition. In another embodiment, the self-adhesive resin composition comprises a phenol or cresol novolac epoxy resin and a nitrile rubber or nitrile rubber adduct and the nitrile rubber or nitrile rubber adduct is present in an amount of 10 to 40% by weight, preferably 20 to 40% by weight, based on the total weight of the composition.

In an embodiment, the adhesive composition further comprises an oil absorbent. The oil absorbent may comprise an epoxy component or resin having a linear aliphatic non-polar adduct. In an embodiment, the oil absorbent may comprise an epoxy nitrile rubber adduct of the kind hereinbefore described. In another embodiment, the oil adsorbent comprises an inorganic filler. The size of the particles of the inorganic filler may range from 50 microns to 500 microns, preferably from 100 to 200 microns. One preferred inorganic filler is $CaCO_3$, which can provide additional oil absorbency due to its porous microstructure. Suitable $CaCO_3$ fillers are available under the trade name Minfil® from Omya UK Limited, Steeple Morden, Royston, Hertfordshire, United Kingdom. In other embodiments, the oil absorbent may include silicas, fumed silicas, kaolin clays, or absorbent polymers such as polypropylene, polyethylene and polyvinyls. The oil absorbent may be present in an amount of 1 to 10% by weight based on the total weight of the composition, preferably in an amount of 5 to 10% by weight based on the total weight of the composition.

In a further embodiment, the self-adhesive resin composition comprises by total weight of the composition:
 (a) 1 to 45% aromatic epoxy resin;
 (b) 5 to 60% novolac epoxy resin;
 (c) 1 to 10% curing agent;
 (d) 0.05 to 10% corrosion inhibitor;
 (e) 1 to 40% rubber toughening agent; and
 (f) 1 to 10% inorganic filler.

In a further embodiment, component (d) 0.05 to 10% corrosion inhibitor in the previous embodiment is omitted.

In another embodiment, the self-adhesive resin composition further comprises by total weight of the composition:
 (a) 1 to 45% base epoxy resin(s);
 (b) 5 to 60% novolac epoxy resin;
 (c) 1 to 10% curing agent;
 (d) 5 to 30% core shell rubber;
 (e) 1 to 40% nitrile rubber-modified epoxy resin;
 (f) 1 to 10% inorganic filler;
 (g) 0.05 to 0.5% metal salt of an organic compound; and
 (h) 0.5 to 2% inorganic polyphosphate salt.

In an embodiment, the adhesive composition according to the present invention further comprises an accelerator. The accelerator may be a urone type accelerator based on substituted urea. Suitable urea based materials include the range of materials available under the name DYHARD® from Alzchem Group AG, Trostberg, Germany, and urea derivatives such as the ones commercially available as UR200, UR300, UR400, UR600 and UR700. In an embodiment, the urone accelerator is 4,4'-methylenediphenylene bis(N,N-dimethyl urea), CAS No. 10097-09-3, which is commercially available under the trade name Omicure® U52 M from Emerald Performance Materials, Moorefield, N.J., USA. The accelerator may be present in an amount of 1 to 15% by weight, preferably 5 to 10% by weight, based on the total weight of the composition.

In a further embodiment, the self-adhesive resin composition comprises by total weight of the composition:

(a) 1 to 50% aromatic epoxy resin;
(b) 10 to 30% polyethersulfone;
(c) 1 to 10% ethylene vinyl acetate copolymer; and
(d) 1 to 10% curing agent.

Suitable aromatic epoxy resins and curing agent are as previously described. The self-adhesive resin composition may also comprise an accelerator such as a urone based accelerator of the kind previously described.

Suitable polyethersulfone (PES) resins include SumikaExcel® powder grades 3600P, 4100P, 4800P, 5003P, 5200P, 5400P and 5900P, SumikaExcel® unreinforced pellet grades 3600G, 4100G and 4800G, and SumikaExcel® glass fibre reinforced pellet grades 3601GL30, 3601GL20, 4101GL30 and 4101GL20, which are commercially available from Sumitomo Chemical Co., Ltd., Tokyo, Japan.

Suitable ethylene vinyl acetate copolymers include DuPont™ Elvax® 750, 760, 760Q, 770, 670, 660, 650Q, 560, 550, 470, 460, 450, 440, 420, 410, 360, 350, 265, 260, 250, 240 W, 220 W, 150, 150 W, 40L-03, 40 W, 4355, 4320, 4310, 4260, 760A, 660A, 560A, 550A, 470A, 460A, 450A, 420A, 360A, 265A, 260A, 250A or 240A, which are commercially available from E. I. du Pont de Nemours and Company, Wilmington, Del., United States of America.

In this embodiment, the self-adhesive resin composition containing a polyethersulfone and an ethylene vinyl acetate may also comprise an oil absorbent. The oil absorbent may comprise an epoxy component or resin having a linear aliphatic non-polar adduct. In an embodiment, the oil absorbent may comprise an epoxy nitrile rubber adduct of the kind hereinbefore described. In another embodiment, the oil adsorbent comprises an inorganic filler. The size of the particles of the inorganic filler may range from 50 microns to 500 microns, preferably from 100 to 200 microns. One preferred inorganic filler is $CaCO_3$, which can provide additional oil absorbency due to its porous microstructure. Suitable $CaCO_3$ fillers are available under the trade name Minfil® from Omya UK Limited, Steeple Morden, Royston, Hertfordshire, United Kingdom. In other embodiments, the oil absorbent may include silicas, fumed silicas, kaolin clays, or absorbent polymers such as polypropylene, polyethylene and polyvinyls. The oil absorbent may be present in an amount of 1 to 30% by weight based on the total weight of the composition, preferably in an amount of 5 to 25% by weight based on the total weight of the composition.

In a further embodiment, the self-adhesive resin composition comprises by total weight of the composition:
(a) 1 to 50% aromatic epoxy resin;
(b) 10 to 30% polyethersulfone;
(c) 1 to 10% ethylene vinyl acetate copolymer;
(d) 1 to 10% curing agent;
(e) 1 to 30% inorganic filler; and
(f) 1 to 5% accelerator.

In another embodiment, the prepreg according to the present invention in its first aspect further comprises a tack layer on one or both sides of the resin pre-impregnated fibre reinforcement layer. The tack layer may be applied to the prepreg after the latter has been pre-impregnated with the self-adhesive resin composition and optional second resin composition, for example, by applying a film of a suitable tack resin to the surface of the prepreg or by spraying a solution of a suitable resin composition onto the surface of the prepreg.

In a further aspect, the present invention provides the use of a prepreg according to the present invention in its first aspect for bonding to oily steel or oily galvanized steel as a structural reinforcement. The oily steel or oily galvanized steel may form part of a structure that requires further industrial processing steps. In an embodiment, the prepreg is for bonding to an oily or oily galvanized steel blank that will undergo stamping or pressing. The blank may be for use in the automotive industry, such as for example, a door panel or boot or bonnet cover. In other embodiments, the prepreg may be for use as a structural reinforcement in component parts for a wind turbine, including nacelles or rotor blades, or in component parts for the aerospace industry, including nacelles, propellers or rotors, single aisle wings and wide body wings.

In another aspect, the present invention provides a process of preparing a self-adhesive prepreg or semipreg which comprises applying a film of a self-adhesive resin composition to a first side of a fibre reinforcement layer, optionally applying a film of the self-adhesive resin composition or a second resin composition to a second side of the fibre reinforcement layer, and compressing the film-coated layer under vacuum.

In a further aspect, the present invention provides a stack of self-adhesive prepregs according to the present invention in its first aspect. The prepregs may be laid up sequentially. In an embodiment, the prepregs are asymmetric and the stack of prepregs has one outermost face that is self-adhesive and one outermost face that comprises a standard resin matrix. Such an arrangement may be appropriate where the self-adhesive face of the stack is intended to provide structural rigidity only to the structure to which the self-adhesive face is bonded. In another embodiment, both faces of the stack of self-adhesive prepregs may be self-adhesive. In this last embodiment, the prepregs used to make the stack may be symmetrical and comprise self-adhesive resin composition as the sole resin composition. Alternatively, the prepregs in the stack may be asymmetric and laid up sequentially except for the last prepreg which may be laid up non-sequentially such that the self-adhesive resin composition side is outermost. The stack may comprise multiple plies of prepregs in order to achieve a desired thickness depending upon the particular application in which the stack is intended to be used. In a patching application, for example, the final patch may have a thickness of 5 mm and the stack may comprise 2 to 10 prepreg plies or layers. In other embodiments, the stack may comprise 2 to 100 plies, 3 to 90 plies, 4 to 80 plies, 5 to 70 plies, 6 to 60 plies, 7 to 50 plies, 8 to 40 plies, 9 to 30 plies, or 10 to 20 plies of prepreg, or any combination thereof. In other applications, the stack of prepregs may be thicker or thinner. For example, for a leaf spring application, the stack of prepreg could be in the order of several mm to several cm thick.

In another aspect, the present invention provides a method of structurally reinforcing an article, which comprises contacting the article with an adhesive face of a self-adhesive prepreg according to the present invention in its first aspect, or a stack of self-adhesive prepregs according to the present invention in the aspect hereinbefore described, and curing the prepreg in situ. The self-adhesive prepreg according to the present invention may be used in the automotive industry to provide structural rigidity and/or reduce weight of structural components, such as parts of the worked body shell or other body panels, such as doors, wings, bonnets, boot lids, bumpers, etc. In an embodiment, the prepreg is used to provide structural reinforcement to vertical or near vertical metal supports in an automobile, including but not limited to A-pillars, B-pillars, C-pillars, D pillars, etc.

In a further aspect, the present invention provides a structurally reinforced article obtainable by a method according to the present invention in the previous aspect.

EXAMPLES

Example 1

Adhesive composition 1 was prepared from 5.18 g KSR-177 (a silane-modified epoxy resin manufactured by Kukdo Chemical Company Limited, Seoul, South Korea), 5 g Struktol® Polydis® 3611 (a CTBN rubber manufactured by Schill and Seilacher "Struktol" GmbH, Hamburg, Germany), 12 g Araldite® GT6071 (a Type 1 Bisphenol A epoxy resin manufactured by Huntsman Advanced Materials (Switzerland) GmbH, Basel, Switzerland), 21.5 g Kane-Ace® MX-153 (a core shell rubber tougher manufactured by Kaneka Corporation, Tokyo, Japan), 37.5 g XD1000 (a dicyclopentadiene novolac epoxy resin manufactured by Nippon Kayaku, KK, Tokyo, Japan), 8 g Minfil L50 BT (a calcium carbonate filler manufactured by Omya UK Limited, Royston, Hertfordshire, UK), 1 g Heucophos® SAPP (a strontium aluminium polyphosphate hydrate inorganic corrosion inhibitor manufactured by Heubach GmbH, Langelsheim, Germany), 0.12 g Heucorin® RZ (a zinc-5-nitroisophthalate organic corrosion inhibitor manufactured by Heubach GmbH, Langelsheim, Germany), 0.2 g Araldite® DW 0135 Blue (a no-solvent colouring paste manufactured by Huntsman Advanced Materials (Switzerland) GmbH, Basel, Switzerland), 5 g Dyhard® 100E (a dicyandiamide curing agent manufactured by Alzchem Group Ag, Trostberg, Germany) and 4.5 g Omicure® U52M (a curing agent manufactured by Emerald Performance Materials, Moorefield, N.J., USA).

Adhesive composition 2 was prepared from 15 g Araldite® GT6099N (a Type 9 Bisphenol A epoxy resin manufactured by Jubail Chemical Industries Co. (JANA), Jubail, Saudi Arabia), 30 g Struktol® Polydis® 3611 (a CTBN rubber manufactured by Schill and Seilacher "Struktol" GmbH, Hamburg, Germany), 27 g YD-136 (a semi-solid epoxy resin manufactured by Kukdo Chemical Company Limited, Seoul, South Korea), 9.78 g YDPN 638 (a phenol novolac epoxy resin manufactured by Kukdo Chemical Company Limited, Seoul, South Korea), 8 g Minfil® L50 BT (a calcium carbonate filler manufactured by Omya UK Limited, Royston, Hertfordshire, UK), 1.1 g Heucophos® SAPP (a strontium aluminium polyphosphate hydrate inorganic corrosion inhibitor manufactured by Heubach GmbH, Langelsheim, Germany), 0.12 g Heucorin® RZ (a zinc-5-nitroisophthalate organic corrosion inhibitor manufactured by Heubach GmbH, Langelsheim, Germany), 0.2 g Araldite® DW 0135 Blue (a no-solvent colouring paste manufactured by Huntsman Advanced Materials (Switzerland) GmbH, Basel, Switzerland), 4.8 g Dyhard® 100E (a dicyandiamide curing agent manufactured by Alzchem Group Ag, Trostberg, Germany) and 4 g Omicure® U52M (a curing agent manufactured by Emerald Performance Materials, Moorefield, N.J., USA).

Resin matrix composition 3 was prepared from 9.7 g SCT-150 (an epoxy cresol novolac resin manufactured by Shin-A T&C, Seoul, South Korea), 9.7 g XD1000 (a dicyclopentadiene novolac epoxy resin manufactured by Nippon Kayaku, KK, Tokyo, Japan), 16.5 g YDPN 638 (a phenol novolac epoxy resin manufactured by Kukdo Chemical Company Limited, Seoul, South Korea), 15.5 g Araldite® GT6071N (a Type 1 Bisphenol A epoxy resin manufactured by Huntsman Advanced Materials (Switzerland) GmbH, Basel, Switzerland), 1.5 g Aerosil® R202 (a hydrophobic fumed silica manufactured by Evonik Resource Efficiency GmbH, Hanau-Wolfgang, Germany), 1.5 g PAT®-656/B3R (an internal release agent manufactured by E & P Wurtz GmbH & Co. KG, Bingen am Rhein, Germany), 19.4 g Kane-Ace® MX-153 (a core shell rubber tougher manufactured by Kaneka Corporation, Tokyo, Japan), 6.8 g Technicure® ADH-J (a milled adipic dihydrazide curative manufactured by A&C Catalysts, Inc., Linden, N.J., USA), 5.82 g MDU-11M (U52M) (a curing agent manufactured by Emerald Performance Materials, Moorefield, N.J., USA) and 13.58 g Epikote® 828 (a medium viscosity liquid epoxy resin manufactured by Hexion Speciality Chemicals, Inc., Columbus, Ohio, USA).

Sample films of adhesive composition 1 or adhesive composition 2 were laminated onto the obverse sides of 150 mm×150 mm pieces of BB600 fabric and sample films of resin matrix composition 3 was laminated onto the reverse side of each piece of BB600 fabric to form single ply asymmetric self-adhesive prepregs. The amount by weight of adhesive composition 1, adhesive composition 2 or resin matrix composition 3 present in the film layers was calculated to give asymmetric prepregs having a total adhesive/resin content of 50% based on the total weight of the prepreg. The prepregs were cut to 25 mm×12.5 mm (allowing for 12.5 mm overlap) for lap shear strength tests. 2 asymmetric plies of adhesive prepreg 1 or adhesive prepreg 2 were stacked with the adhesive sides outermost and resin matrix sides innermost and cured between clean zinc galvanized steel substrates at a temperature of 150° C. for 15 minutes and the resultant lap shear strength (MPa) measured according to BS EN2243-1: 2005.

Cured prepreg stacks (2 plies) made from adhesive composition 1 and resin matrix composition 3 pre-impregnated BB600 fabric showed a lap shear strength on clean zinc galvanized steel of 19.5 MPa with an SD value of 0.9 and a CV value of 4.5. The failure mode was cohesive in adhesive.

Cured prepreg stacks (2 plies) made from adhesive composition 2 and resin matrix composition 3 pre-impregnated BB600 fabric showed a lap shear strength on clean zinc galvanized steel of 21.2 MPa with an SD value of 1.9 and a CV value of 9. The failure mode was cohesive in adhesive.

Example 2

Adhesive composition 1 and 2 and resin matrix composition 3 were prepared as in Example 1.

Sample films of adhesive composition 1 or adhesive composition 2 were laminated onto the obverse sides of 150 mm×150 mm pieces of BB200 fabric and resin matrix composition 3 was laminated onto the reverse side of each piece of BB200 fabric to form single ply asymmetric self-adhesive prepregs. The amount by weight of adhesive composition 1, adhesive composition 2 or resin matrix composition 3 present in the film layers was calculated to give asymmetric prepregs having a total adhesive/resin content of 50% based on the total weight of the prepreg. The prepregs were cut to 25 mm×12.5 mm (allowing for 12.5 mm overlap) for lap shear strength tests. Two asymmetric plies of adhesive prepreg 1 or adhesive prepreg 2 were stacked with the adhesive sides outermost and resin matrix sides innermost and cured between clean zinc galvanized steel substrates at a temperature of 150° C. for 15 minutes and the resultant lap shear strength (MPa) measured according to BS EN2243-1: 2005.

Cured prepreg stacks (2 plies) made from adhesive composition 1 showed a lap shear strength on clean zinc galvanized steel of 22.6 MPa with an SD value of 0.7 and a CV value of 3.2. The failure mode was cohesive in adhesive.

Cured prepreg stacks (2 plies) made from adhesive composition 2 showed a lap shear strength on clean zinc galvanized steel of 24.7 MPa with an SD value of 1.1 and a CV value of 4.6. The failure mode was cohesive in adhesive.

Example 3

Adhesive composition 1 was prepared as in Example 1.

Sample films of adhesive composition 1 were laminated onto the obverse and reverse sides of 150 mm×150 mm pieces of BB200 fabric to form single ply symmetric self-adhesive prepregs 1. The amount by weight of adhesive composition 1 present in the film layers was calculated to give symmetric prepregs having a total adhesive composition content of 50% based on the total weight of the prepreg. The prepregs were cut to 25 mm×12.5 mm (allowing for 12.5 mm overlap) for lap shear strength tests. Single symmetric plies of adhesive prepreg 1 were cured between clean zinc galvanized steel substrates at a temperature of 150° C. for 15 minutes. Two symmetric plies of adhesive prepreg were stacked sequentially and cured between clean zinc galvanized steel substrates at a temperature of 150° C. for 15 minutes. The resultant lap shear strength (MPa) of both single ply and double ply symmetric prepregs of adhesive composition 1 were measured according to BS EN2243-1: 2005.

Cured prepregs (1 ply) made from adhesive composition 1 showed a lap shear strength on clean zinc galvanized steel of 25.2 MPa with an SD value of 0.2 and a CV value of 0.8. The failure mode was cohesive in adhesive.

Cured prepreg stacks (2 plies) made from adhesive composition 1 showed a lap shear strength on clean zinc galvanized steel of 23.2 MPa with an SD value of 0.9 and a CV value of 3.7. The failure mode was cohesive in adhesive.

Example 4

Adhesive composition 2 was prepared as in Example 1.

Sample films of adhesive composition 2 were laminated onto the obverse and reverse sides of 150 mm×150 mm pieces of BB600 fabric to form single ply symmetric self-adhesive prepregs 2. The amount by weight of adhesive composition 2 present in the film layers was calculated to give symmetric prepregs having a total adhesive composition content of 50% based on the total weight of the prepreg. The prepregs were cut to 25 mm×12.5 mm (allowing for 12.5 mm overlap) for lap shear strength tests. Single symmetric plies of adhesive prepreg 1 were cured between clean zinc galvanized steel substrates at a temperature of 150° C. for 15 minutes. Two symmetric plies of adhesive prepreg were stacked sequentially and cured between clean zinc galvanized steel substrates at a temperature of 150° C. for 15 minutes. The resultant lap shear strength (MPa) of both single ply and double ply symmetric prepregs of adhesive composition 1 were measured according to BS EN2243-1: 2005.

Cured prepregs (1 ply) made from adhesive composition 2 showed a lap shear strength on clean zinc galvanized steel of 26.2 MPa with an SD value of 1.8 and a CV value of 6.8. The failure mode was cohesive in adhesive.

Cured prepreg stacks (2 plies) made from adhesive composition 1 showed a lap shear strength on clean zinc galvanized steel of 24.9 MPa with an SD value of 1.4 and a CV value of 5.5. The failure mode was cohesive in adhesive.

We have found that self-adhesive prepregs prepared in accordance with the present invention from BB600 or BB200 fabric impregnated on one side with a self-adhesive resin composition containing a corrosion inhibitor and impregnated on the other side with a standard resin matrix composition containing an internal release agent (asymmetric prepregs) showed good lap shear strengths on clean zinc galvanized steel. Asymmetric two ply prepregs showed increased lap shear strengths with BB200 fabric compared to BB600 fabric.

We have found that self-adhesive prepregs prepared in accordance with the present invention from BB600 or BB200 fabric impregnated on both sides with a self-adhesive resin composition containing a corrosion inhibitor (symmetric prepregs) showed good lap shear strengths on clean zinc galvanized steel. There was little change in lap sheer strength between prepregs comprising a single fabric ply (1 ply) and a stack of two fabric plies (2 plies) on the test fabrics concerned (BB200 and BB600). Best laps shear strength results were obtained for both adhesive compositions using BB200 fabrics.

The invention claimed is:

1. A prepreg comprising a fibre reinforcement layer having a first side and a second side, wherein at least the first side of the fibre reinforcement layer has been pre-impregnated with a self-adhesive resin composition comprising:
   by total weight of the composition:
   (a) 1 to 45% aromatic epoxy resin, said aromatic epoxy resin being silane-modified;
   (b) 5 to 60% novolac epoxy resin;
   (c) 1 to 10% curing agent;
   (d) 0.05 to 10% corrosion inhibitor;
   (e) 1 to 40% rubber toughening agent; and
   (f) 1 to 10% inorganic filler.

2. The prepreg as claimed in claim 1, wherein said novolac epoxy resin is a dicyclopentadiene novolac epoxy resin or a phenol novolac epoxy resin.

3. The prepreg as claimed in claim 2, wherein said rubber toughening agent comprises a core-shell rubber toughening agent, a carboxyl-terminated butadiene-acrylonitrile rubber toughening agent or an amine-terminated butadiene-acrylonitrile rubber toughening agent.

4. The prepreg as claimed in claim 3, wherein the corrosion inhibitor is an inorganic polyphosphate salt.

5. The prepreg as claimed in claim 4, wherein the fibre reinforcement layer comprises non-woven fibre.

* * * * *